(12) United States Patent
Brennan

(10) Patent No.: US 8,360,779 B1
(45) Date of Patent: Jan. 29, 2013

(54) METHOD AND APPARATUS FOR A READING FOCUS CARD

(76) Inventor: Joan Brennan, St. Louis, MO (US)

( * ) Notice: Subject to any disclaimer, the term of this patent is extended or adjusted under 35 U.S.C. 154(b) by 864 days.

(21) Appl. No.: 12/456,495

(22) Filed: Jun. 17, 2009

Related U.S. Application Data

(63) Continuation-in-part of application No. 11/636,746, filed on Dec. 11, 2006, now Pat. No. 7,565,759.

(51) Int. Cl.
*G09B 11/00* (2006.01)

(52) U.S. Cl. .......................... 434/181; 345/629

(58) Field of Classification Search .................. 434/178, 434/181–184
See application file for complete search history.

(56) References Cited

U.S. PATENT DOCUMENTS

| | | |
|---|---|---|
| 1,658,499 A | 2/1928 | Stevens |
| 2,699,748 A | 1/1955 | Crawford |
| 3,248,050 A | 4/1966 | Dickson |
| 3,982,332 A | 9/1976 | Szymczak |
| 4,016,659 A | 4/1977 | Merrigan |
| 4,196,529 A | 4/1980 | Esbensen |
| 4,728,294 A | 3/1988 | Bredehorn |
| 5,458,376 A | 10/1995 | Biewald |
| 5,584,698 A | 12/1996 | Rowland |
| D469,121 S | 1/2003 | Manzo |
| 6,622,406 B2 | 9/2003 | Usher et al. |
| 6,726,487 B1 * | 4/2004 | Dalstrom ...................... 434/178 |
| D495,740 S | 9/2004 | Lee |
| 6,832,915 B1 | 12/2004 | Kirby |
| 6,863,533 B2 | 3/2005 | Palacios |
| 7,565,759 B1 | 7/2009 | Brennan |
| 7,954,444 B2 | 6/2011 | Smith |
| 8,070,492 B1 | 12/2011 | Mckinnis |
| 2002/0167534 A1 * | 11/2002 | Burke ........................ 707/512 |
| 2003/0228559 A1 | 12/2003 | Hajjar et al. |
| 2009/0144654 A1 * | 6/2009 | Brouwer et al. ............ 715/700 |

FOREIGN PATENT DOCUMENTS

GB  2114514 A  8/1983

* cited by examiner

*Primary Examiner* — Kathleen Mosser
(74) *Attorney, Agent, or Firm* — Armstrong Teasdale LLP

(57) ABSTRACT

A method and apparatus are provided for displaying a plurality of alphanumeric characters on a display device that is connected to an automated device having a processor, a memory, and an input device. The automated device executes a plurality of instructions that configure the processor to provide a reading focus tool on the display device. The reading focus tool includes a first section and a rectangular window within the first section and a notch section. The reading focus tool overlays the plurality of alphanumeric characters and aligns at least one line of alphanumeric characters within at least one of the rectangular window and the notch section. Further, a user is enabled to move the reading focus tool to a selection of alphanumeric characters to be read.

19 Claims, 13 Drawing Sheets

METHOD AND APPARATUS FOR A READING FOCUS CARD

CLAIMS OF PRIORITY

This patent application is a continuation-in-part and claims the benefit of priority of U.S. patent application Ser. No. 11/636,746, filed on Dec. 11, 2006 now U.S. Pat. No. 7,565,759, titled "A READING FOCUS CARD", the complete subject matter is hereby expressly incorporated herein in its entirety.

TECHNICAL FIELD

The invention relates generally to methods and apparatus to facilitate reading lines of text for persons of all reading ability and age levels, and more particularly to a software program that enables persons to focus while reading text displayed from an automated device, such as a computer.

BACKGROUND OF THE INVENTION

A broad population of people of all ages have trouble reading because they cannot focus on a block of text. Readers who have difficulty isolating individual blocks of text in a book, magazine, printed sheet or on a computer screen may also have trouble eye-tracking in a steady, left to right motion. Unfortunately with children, attention is often centered on differentiating between causes and types of reading problems, e.g., dyslexia, attention deficit disorder (ADD) or attention deficit hyperactivity disorder (ADHD), and treating the child or adolescent with medications. Yet, people with a reading disability may compensate and learn to read well without the need for medical treatment. For some people, an accommodation such as a line-marker card, transparent overlay or "reading ruler" with a colored window may help them to focus on while reading.

The above-mentioned accommodations (i.e., line-marker cards, overlays and reading rulers) may help a reader isolate a block of text but they do not promote left to right eye-tracking motion. What is needed is an accommodation that promotes left to right eye-tracking motion, isolates a block of text, is inexpensive to manufacture, and can be easily installed on an automated device, such as a computer, for persons reading from the display of the automated device. The addition of color to an isolated block or a line of text would also be desirable, but different people are stimulated by different colors or by different colors at different times. It would therefore be desirable if the accommodation permitted a user to experiment with different colors and allow the user to change the foreground and background colors as well as the level of opaqueness of the foreground and background to discover what colors and what level of translucent or opaqueness works best for him or her.

Such an accommodation would be particularly useful with children and adults who as yet are undiagnosed with a reading disorder but who are experiencing difficulty reading. If the accommodation "works" for the user, the time and expense in appointment scheduling, testing and evaluation, by either private or special school district personnel may be avoided, as well as the stigma of being diagnosed with a disability and treatment with drugs. If the accommodation "works," another person is not required for reading success and the accommodation can be used independently by the reader to help build confidence and self-esteem.

BRIEF SUMMARY OF THE INVENTION

In accordance with one embodiment, a reading focus card apparatus is provided. The reading focus card includes a front rectangular sheet of material having a front side with a tactually pleasing, non-slick surface, an upper and a lower edge and a right and a left edge, said upper edge having a notch extending to the left edge, a rectangular window formed in the sheet between the upper and lower edge and extending to the left edge. The reading focus card further includes a rear rectangular sheet of material having a rear side with a slick surface, an upper and a lower edge and a right and a left edge, and a notch in the upper edge and a window in the sheet in registry with the notch and the window in the front rectangular sheet. In addition, the reading focus card includes a transparent plastic insert between the front and rear rectangular sheets positioned in the windows. An adhesive is used between the front and rear rectangular sheets for holding the front and rear rectangular sheets and transparent plastic insert in assembly, said adhesive permitting disassembly of the reading focus card multiple times such that a different transparent plastic insert may be inserted between the front and rear rectangular sheets.

In accordance with another embodiment, a method is provided for displaying a plurality of alphanumeric characters on a display device that is connected to an automated device having a processor, a memory, and an input device. The automated device executing a plurality of instructions that configure the processor to provide a reading focus tool on the display device. The reading focus tool includes a first section and a rectangular window within the first section and a notch section. The reading focus tool overlays the plurality of alphanumeric characters and aligns at least one line of alphanumeric characters within at least one of the rectangular window and the notch section. Further, a user is enabled to move the reading focus tool to a selection of alphanumeric characters to be read.

In accordance with another embodiment, a system for assisting a person while reading is provided that includes an automated device having a processor, a memory, an input device and a display. The display device is configured to show a plurality of characters. The processor executes a plurality of instruction to display a reading focus tool over the plurality of characters on the display device. The reading focus tool having a first section, a rectangular window, and a notch area. The reading focus tool is configured to respond to a user's commands directing the input device to control (i) a height and a width of the rectangular window and the notch area and (ii) a rate the rectangular window and the notch area moves over the plurality of characters.

In an alternative embodiment, a computer readable medium for assisting persons to read is provided. The computer readable medium includes a set of instructions for an automated device that includes a processor, a memory, an input device and a display device to execute. The processor executes the instructions to position a reading focus tool that includes a first area, a window area, and a notch area over the plurality of alphanumeric characters. The processor further executes instructions to align the reading focus tool such that the alphanumeric characters are displayed in at least one of the notch area and the window area, and moves the reading focus tool, wherein at least one of the notch area and the window area are continuously aligned with the alphanumeric characters as a user controls a rate of movement of the reading focus tool.

DETAILED DESCRIPTION OF THE INVENTION

In the following detailed description, reference is made to the accompanying drawings which form a part hereof, and in which is shown by way of illustration specific embodiments in which the present invention may be practiced. These embodiments, which are also referred to herein as "examples," are described in sufficient detail to enable those skilled in the art to practice the invention, and it is to be understood that the embodiments may be combined, or that other embodiments may be utilized and that structural, mechanical, software, and logical changes may be made without departing from the scope of the various embodiments of the present invention. The following detailed description is, therefore, not to be taken in a limiting sense, and the scope of the present invention is defined by the appended claims and their equivalents.

In this document, the terms "a" or "an" are used, to include one or more than one. In this document, the term "or" is used to refer to a nonexclusive or, unless otherwise indicated. Further the term "about" is used to indicate a range of at least +/−10% of the indicated value.

The term "tactually pleasing" or "tactually appealing" is used in this document to indicate a user's individual preference based on a touch sensation. Some users may prefer a smooth surface, another user may prefer a surface having minimal roughness, other users may prefer a firm surface, and others may prefer a surface that "gives" providing a "spongy" feel. Thus, "tactually pleasing" and "tactually appealing" is not limited in any way but incorporates all the various types of surface conditions a material may be composed of.

Figure 2:
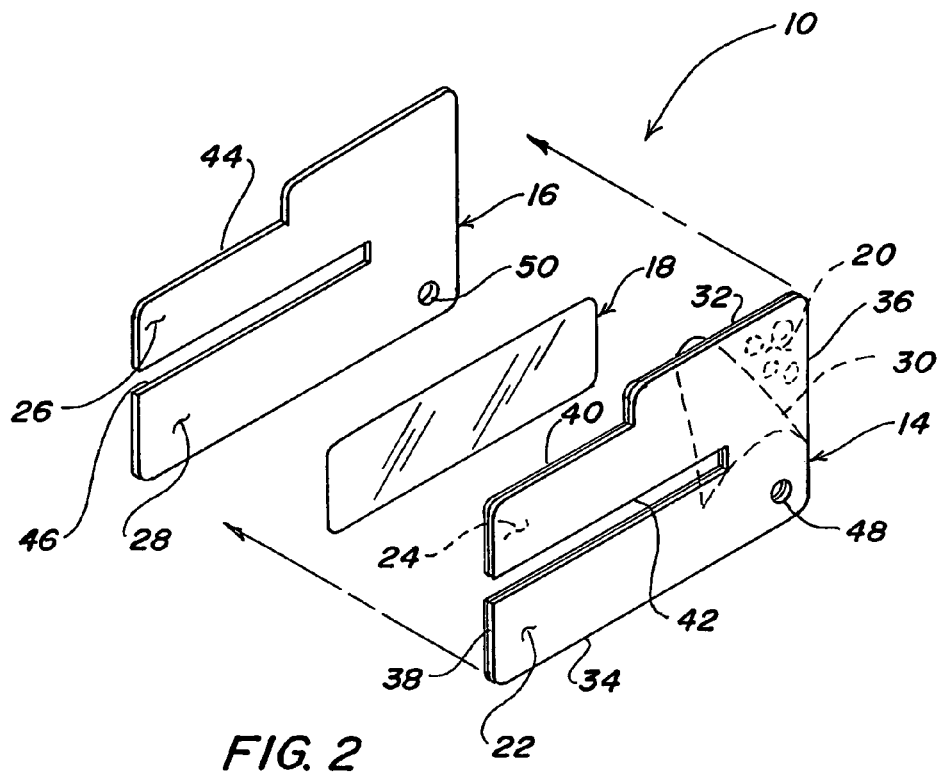
FIG. 2 is an exploded perspective view of the focus card prior to assembly in accordance with one embodiment of the present invention.
Figure 3:
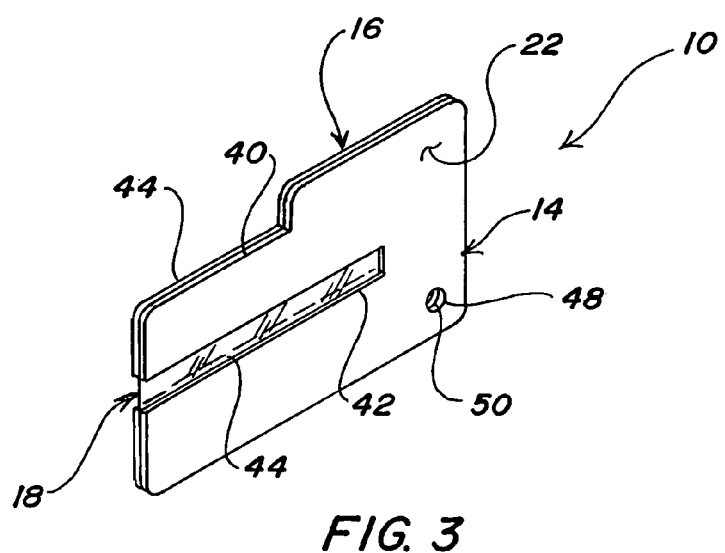
FIG. 3 is a perspective view of the focus card after assembly in accordance with one embodiment of the present invention.

Referring to the drawings more particularly by reference character, reference numeral 10 refers to a focus card in accordance with the present invention. Focus card 10 is preferably provided to a user 12 in disassembled form as shown in FIG. 2. As shown therein, focus card 10 includes a front rectangular sheet of material 14 and a rear rectangular sheet of material 16 between which is sandwiched a transparent plastic insert 18. Front sheet 14, rear sheet 16, and transparent plastic insert 18 are held together in assembled condition as shown in FIG. 3 by an adhesive 20 applied to either front sheet 14 or rear sheet 16.

Front rectangular sheet of material 14 has a first or front surface 22 with a tactually appealing, non-slick surface and a second or inside surface 24 to which adhesive 20 can adhere. In one form as shown in FIG. 2, front sheet 14 may be formed of polyfoam, a craft material commercially available from art stores. Rear rectangular sheet of material 16 may be formed of plastic and has a first or rear surface 26 that is slick and smooth such that the focus card 10 may easily glide over a sheet of paper and a second or inside surface 28 to which adhesive 20 can adhere. An adhesive 20 may be covered with a peel-off sheet or paper film 30 on second surface 24, 28 of front or rear sheet, respectively.

With continuing reference to FIG. 2, front sheet 14 has an upper 32 and a lower edge 34 and a right 36 and a left edge 38. A notch 40 is formed in upper edge 32 opening to left edge 38. A rectangular window 42 is also formed in front sheet 14 between upper and lower edges 32, 34, also opening to left edge 38. Rear sheet 16 also has a notch 44 and a window 46 in registry with notch 40 (e.g., align and match together during assembly) and window 42 in front sheet 14 when focus card 10 is assembled as shown in FIG. 3.

Transparent plastic insert 18 may be clear or colored a varied of colors, for example, yellow, green, or blue and the like. For some users, the use of color may help them focus on the block or line of text that is to be read. Front sheet 14 may be bland in color such that it does not distract a user and rear sheet 16 may be colored or not. For example, the term "bland in color" refers to the polyfoam face piece of the focus card 10 that may be a pastel or a soft, light color that is not bright. In some instances, some people having attention-deficit hyperactive disorder (ADHD) have improved reading skills when using a bright front sheet while others read better with a beige or vanilla, for instance bland, color front sheet. Each person is different and may not know what works best until various colors are used on a "trial and error" basis.

A limited set of inserts 18 may be provided with front sheet 14 and rear sheet 16 as part of a kit such that a user may experiment with different window colors. Transparent plastic insert 18 may have magnifying capability and be, for example, a Fresnel lens.

As illustrated in the drawings, front and rear sheets 14, 16 measure about 5"×7" in which form focus card 10 may also be used as a bookmark. Aligned notches 40, 44 and windows 42, 66 may be about 1 cm in height with notches 40, 44 being about 6 cm in width and windows 42, 46 about 9 cm. Notches 40, 44 and windows 42, 46 with these dimensions have been found suitable for the font size of the printed text that is typical for a textbook or magazine. The length of notches 40, 44 and windows 42, 46 permit a user to focus on a group of words, which is necessary for reading comprehension, but not so many words that focus is lost.

Typically, good reading comprehension, as known by those in the art, requires at least the following ten factors: (1) focus on what is to be read; (2) concentrate on what is to be read; (3) use accurate and fluent word reading skills; (4) use verbal language skills (e.g., vocabulary and linguistic comprehension); (5) have and use appropriate conceptual and factual knowledge; (6) have knowledge and skill in the use of cognitive strategies to improve comprehension or repair when it breaks down; (7) reason and use inferential skills; (8) be motivated to understand and interest in task and materials; (9) review what has been read; and (10) Retain what has been read. Of these ten factors educators known that factors such as focus, concentration, motivation, and interest are issues with readers afflicted with ADHD and/or attention-deficient disorder (ADD). The focus card assists persons by helping with focus, concentration, motivation and review of what is being read.

It will be understood that focus card 10 in one embodiment is not limited to particular dimensions (e.g., about 5"×7", about 3"×5", and the like). For instance, the measurements of front and rear sheets 14, 16 may vary with the column width of the material being read and the height and width of notches 40, 44 and windows 42, 46 may vary with the size of the type of font being utilized.

An aperture 48 may be provided in front sheet 14 adjacent lower and right edges 34, 36 viewed from first or front surface 22 with rear sheet 16 having an aperture 50 adapted to be in registry with aperture 48 when the focus card 10 is assembled. Apertures 48, 50 may be used for attachment to a ring of a notebook (not shown) to help user 12 to avoid loss or misplacement of focus card 10 and keeps focus card 10 always at hand and available for the user 12 to use.

In use, focus card 10 may help beginning and accomplished readers who have trouble focusing their attention on a line of text and assist in eye-tracking in a left to right motion. "Left to right motion" or movement of the eye from the left to the right while reading is promoted via the rectangular reading window, which is open on the left side of the focus card 10 where the next line of text can be tracked or "picked up" by the reader. Because of the open window, the reader's eyes are "forced" to read in a left-to-right direction. Focus card 10 has the potential to accommodate persons with focusing challenges that are optometric and/or neurologic in nature. Focus card 10 is inexpensive to manufacture and is easily assembled by user 12.

In one embodiment, the focus card 10 may be supplied to user 12 in disassembled form with a set of transparent plastic inserts 18 of different colors (e.g., clear, yellow, green and blue) such that the user may take ownership of the tool by assembling it. Further, by the user 12 assembling the focus card 10, the user 12 is familiar with the construction of the focus card 10 and is comfortable in changing the plastic inserts 18 and may be more willing to experiment with various colors to determine what is most effective. Moreover, when focus card 10 is provided as a kit manufacturing costs are minimized and assembly costs saved. If a user's initial selection for plastic insert 18 is unsatisfactory or becomes unsatisfactory in time, adhesive 20 is selected such that front and rear sheets 14, 16 may be picked apart. Insert 18 can then be peeled off and a different insert 18 of another color positioned between windows 42, 46. As aforementioned, the color or lack thereof may be customized by user 12 to what is effective for him or her. There is no complicated testing procedure: The user will know straight away which color "works" because using the focus card 10 with the correct color will feel comfortable to user 12 as he or she reads text. The choice of color may facilitate success in using the focus card 10 and contribute to the feeling of being empowered to read and learn.

Figure 1:
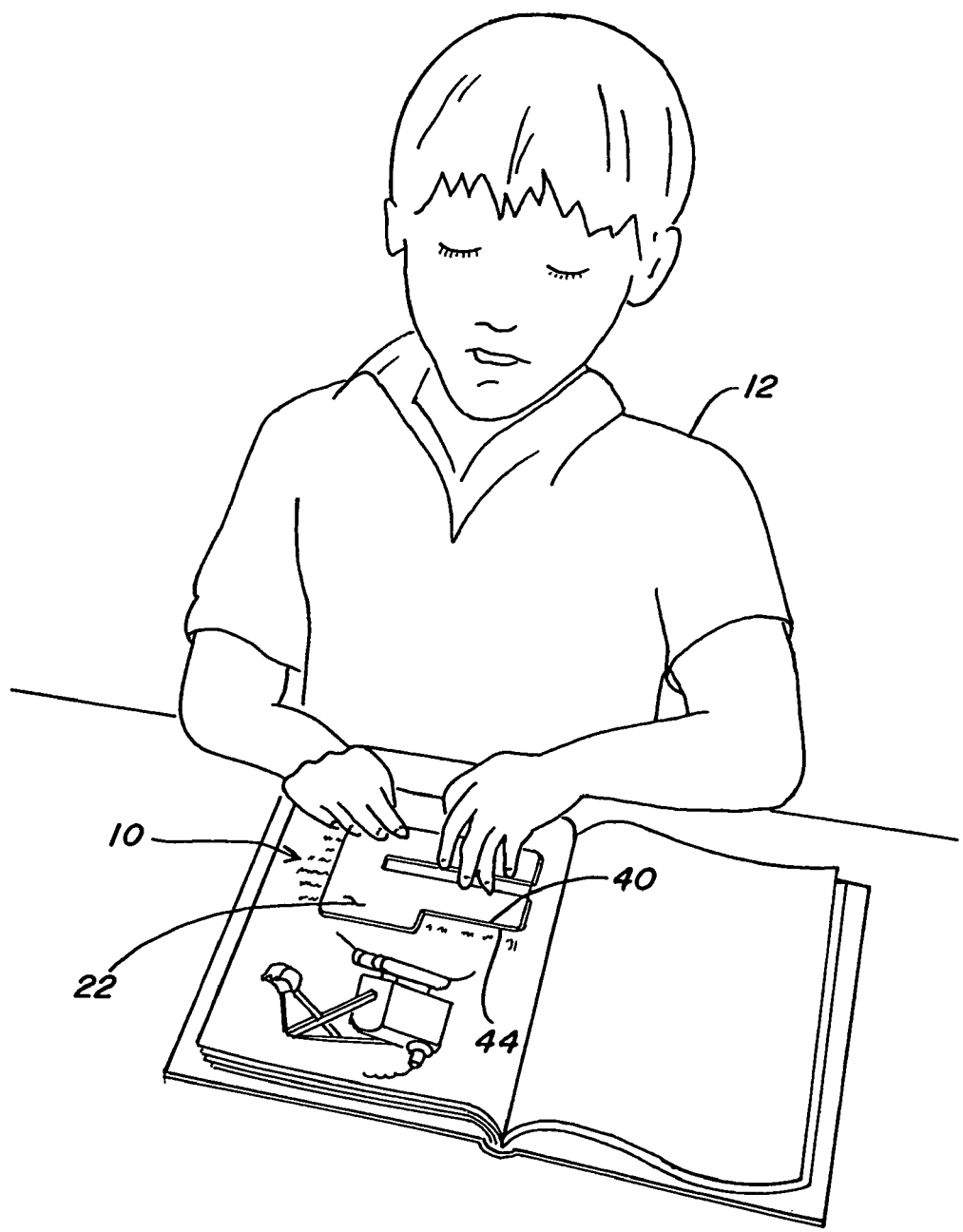
FIG. 1 is a perspective view of a child using a reading focus card in accordance with one embodiment of the present invention.
Figure 4:
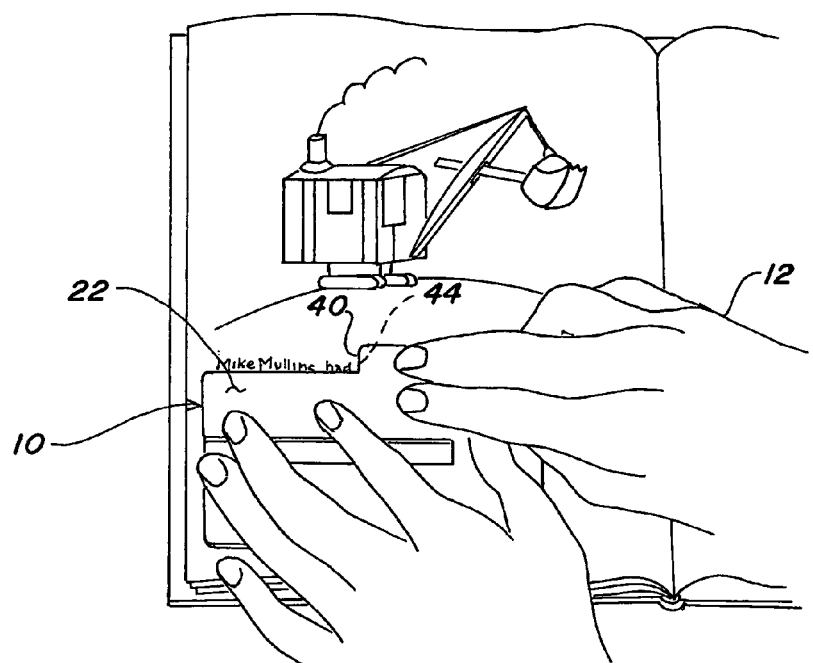
FIG. 4 illustrates use of a notch opening to the left along the top edge of the focus card of FIG. 3 utilized as a reading aid in accordance with one embodiment of the present invention.
Figure 5:
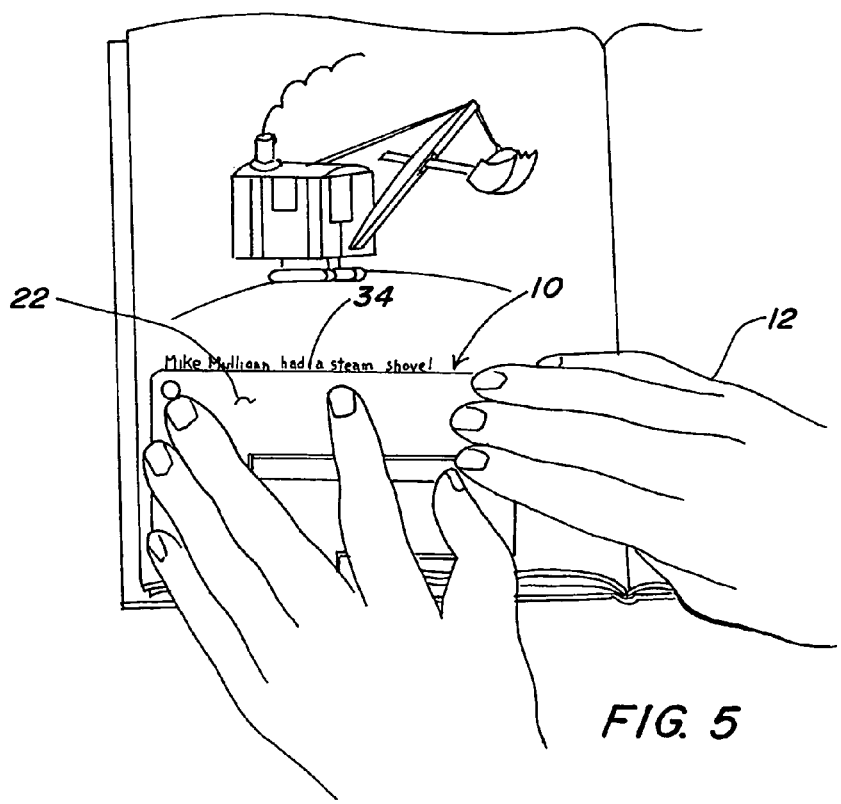
FIG. 5 illustrates use of a bottom edge of the focus card of FIG. 3 utilized as a reading aid in accordance with one embodiment of the present invention.
Figure 6:
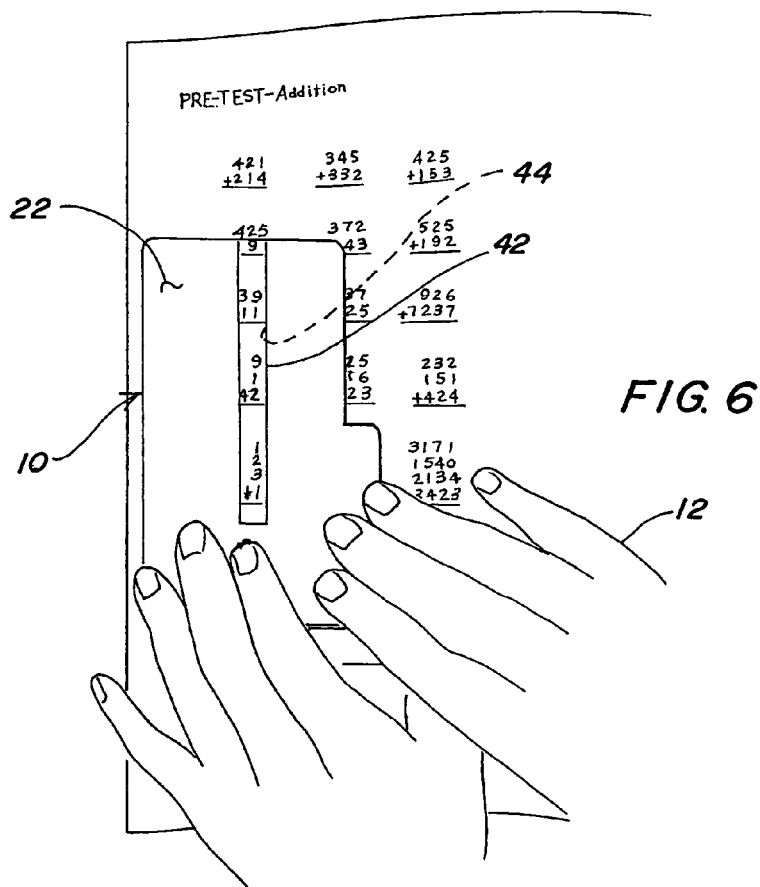
FIG. 6 illustrates use of a window of the focus card of FIG. 3 utilized as a reading aid with columns of numbers in accordance with one embodiment of the present invention.
Figure 7:
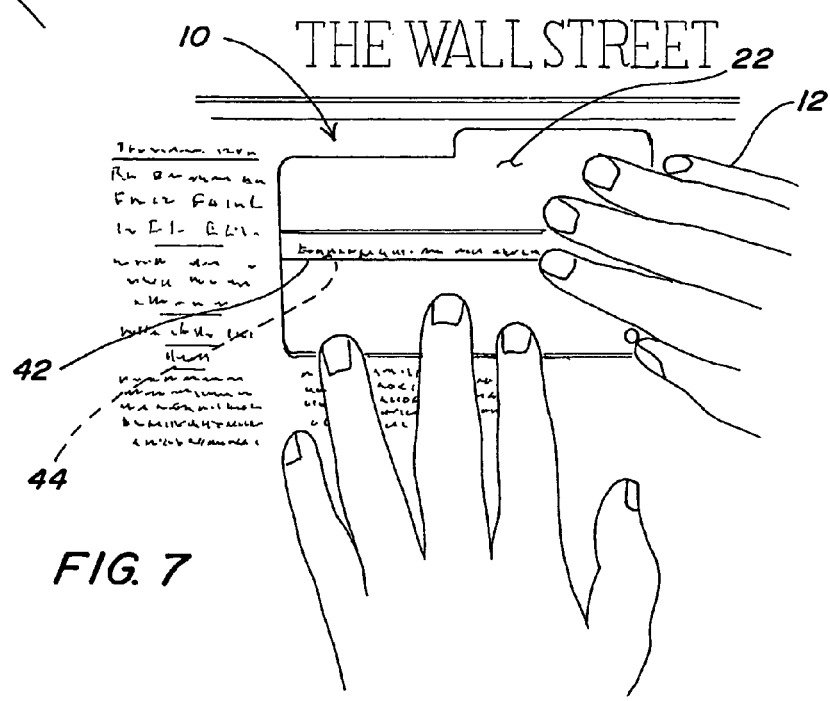
FIG. 7 illustrates use of the window of the focus card of FIG. 3 opening to the left as a reading aid with a block or line of text in accordance with one embodiment of the present invention.

Focus card 10 may be used independently by user 12 to build confidence and self-esteem in his or her reading skills. Focus card 10 is versatile in the manner in which it can be used. Referring to FIGS. 1 and 4, it is seen that user 12 may use aligned notches 40, 44 of focus card 10 to isolate a block or line of text. Other users as shown in FIG. 5, may prefer to use aligned lower edge 34 as a reading ruler. Still other users as shown in FIGS. 6 and 7 may prefer to use aligned windows 42, 46 to isolate a block or line of text or a column of numbers. Users who use focus card 10 in this manner may benefit from using a colored transparent plastic insert 18 as a highlighter. User 12 may use focus card 10 in a variety of manners (e.g., thus user 12 is not limited in a single manner of use of the focus card 10), further contributing to the feeling of being empowered. Whichever way focus card 10 is used by user 12, notches 40, 44 and windows 42, 46 act as a concentrator to encourage or promote left to right eye-tracking or top to bottom eye-tracking with columns.

A child's academic success is often dependent on his or her ability to attend as independently as possible to tasks, teachers and classroom expectations. In school, focus card 10 can be used for standardized test taking (e.g., helping the student focus on the correct line of "bubbles" that are to be marked on a standardized achievement test and the like). Aligned apertures 48, 50 may be used to attach focus card 10 to a ring of a key chain or a loose leaf binder (not shown). This is an advantage because it is not unusual for a person having trouble reading to also have a propensity for losing things or being disorganized because they are easily distracted and have trouble concentrating or easily lose focus. Aligned apertures 48, 50 in focus card 10 may help keep the student organized.

Focus card 10 may be used independently by a person having difficulty reading. If focus card 10 helps, user 12 may overcome the difficulty without medical or other intervention. On the other hand, if focus card 10 does not help, it may be laid aside without prejudice at a cost that is minuscule compared to what is saved (i.e., testing, drugs, stigma, etc.) for those whom it "works."

Figure 8A:
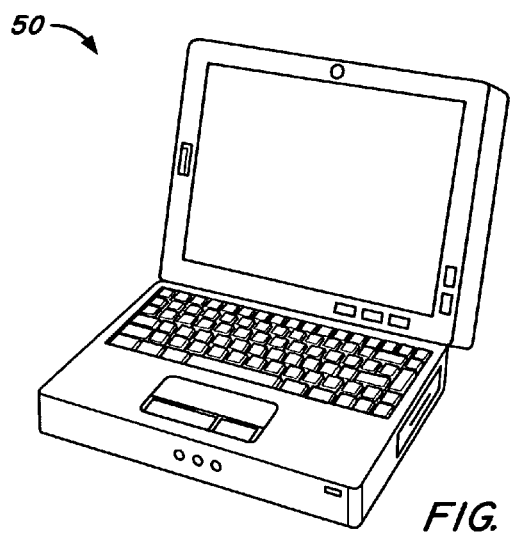
FIGS. 8A and 8B illustrate an automated device and a functional block diagram of certain components of an automated device, respectively, utilized to assist in reading in accordance with an embodiment of the present invention.
Figure 8B:
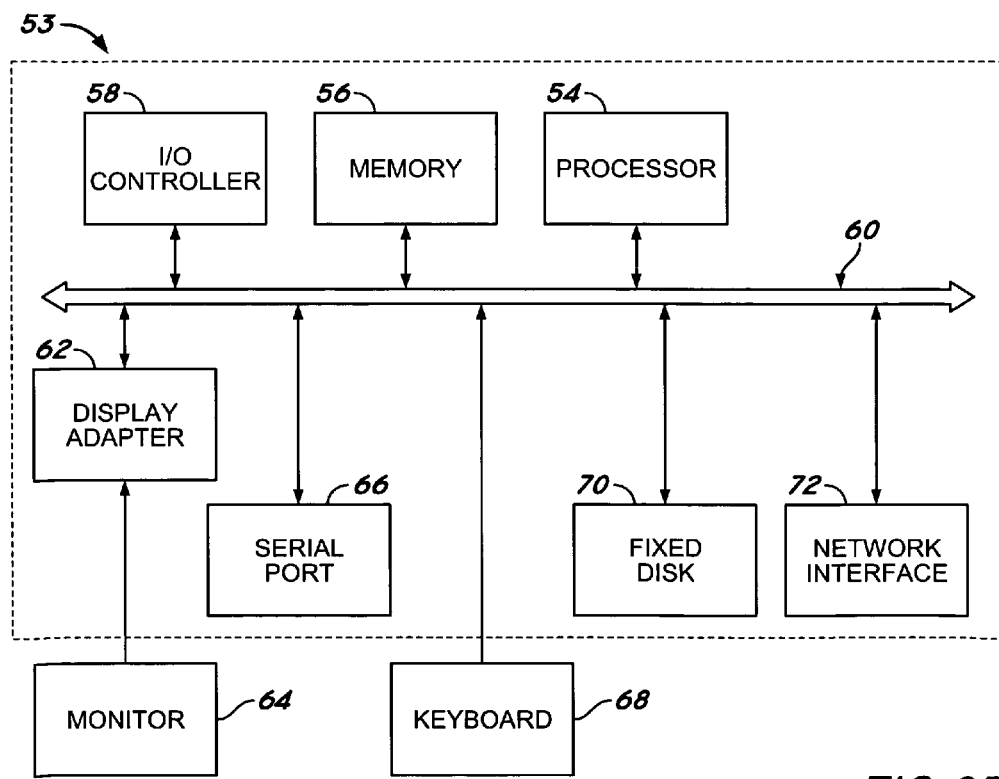
Figure 9:
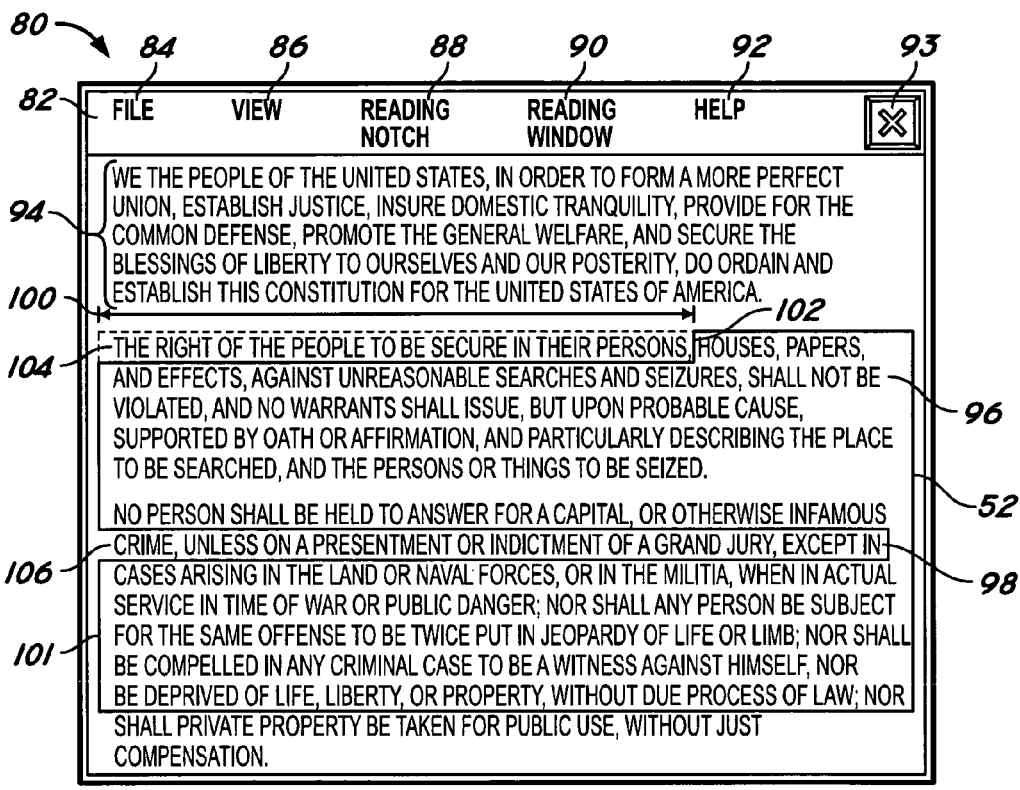
FIG. 9 illustrates a screenshot depicting a reading focus tool utilized to assist in reading in accordance with an embodiment of the present invention.

In an alternative embodiment FIG. 8 illustrates a functional block diagram 53 of certain components of an automated device 50 used to host a reading focus tool 52, shown in FIG. 9. The automated device 50 may be a computer, a controller, an electronic-reader, an electronic book (e.g., an e-book), or any device having a processor connected to a display in accordance with an embodiment of the present invention. Alternatively, the automated device 50 may be a display that is powered by a battery used for displaying text. As shown in FIG. 8B, the automated device 50 includes a processor module 54, memory module 56, an input/output ("I/O") controller module 58, a data/control bus 60, a display adapter 62 connected to a monitor 64, a serial port 66, a keyboard 68, a fixed disk 70 (e.g., the disk may also be removable), a power supply (not shown), and a network interface 72.

The processor module 54 typically includes a microprocessor or equivalent control circuitry for processing instructions for providing a reading focus tool 52 (shown in FIG. 9) implemented, for instance, by a computer readable medium such as a software program. The processor module 54 may further include RAM or Rom memory, logic and timing circuitry, state machine circuitry, and I/O circuitry. Typically, the processor module 54 includes the ability to process or monitor data as controlled by a program code stored in a designated block of memory. Processor module 54 further includes a plurality of switches (not shown) to connect to the data/control bus 60. Processor module 54, by selectively closing appropriate combinations of switches, controls the flow of data between the memory module 56, the I/O controller module 58, and the display adapter 62 via the data/control bus 60.

Data/control bus 60 provides an interface between the various modules. The data/control bus 60 is generally a plurality of insulated conductors that transfer data and control signals between the processor module 54, the memory module 56, the I/O module 58, the fixed/removable disk 70, and display adapter 62 and the network interface 72.

The memory module 56 includes blocks of memory allocated to store the characteristics of the reading focus tool 52 (e.g., the size of the entire tool as displayed, the size of the notch area, and the size of the window area as described below). The characteristics may be measurements based in various units, such as pixels, inches, and other display units known in the art, as well as raw values based on requirements of various display devices, such as the monitor 64. The memory module 56 may also store user preferences for the reading focus tool 52. User preferences may include the level of opacity, the orientation of the reading focus tool 52, the size of the window, and the like.

Input/Output ("I/O") module 58 interfaces with the serial port, the keyboard, the fixed disk, the network interface via data/control bus 60. Alternatively the I/O module may connect to an input device (not shown) that is at least one of a mouse, a touchpad, a stylist, a scrolling wheel, a device having a touch sensor, a heat sensor, a light sensor, and a pressure sensor. The I/O module 58 may control various input and output as directed by the processor 54 to other devices connected to the automated device 50. In addition, the I/O module 58 may interface with the display adapter 62 to present data from other devices to the monitor 64. For example, an e-book may be connected through the serial port 66 (e.g., a universal serial bus, "USB") and the contents displayed onto the monitor 64. Monitor 64 may be any type of display that shows alphanumeric characters (e.g., a computer monitor, a LCD display, a TV display, an e-book, a PDA, and the like). Alternatively, the I/O module 589 may be may be utilized to load the executable software for a reading focus tool 52 stored in the memory module 56 onto an external device (not shown), such as an e-book, a personal digital assistant, a tablet Personal Computer ("PC"), and the like.

The processor 54 is configured to execute a computer readable medium for assisting persons to read, such as a reading focus tool 52, shown in FIG. 9. The computer readable medium includes a plurality of instructions for the processor to (1) position a reading focus tool having a first area, a window area, and a notch area over the plurality of alphanumeric characters; (2) align the reading focus tool such that the alphanumeric characters are displayed in at least one of the notch area and the window area; and (3) move the reading focus tool, wherein at least one of the notch area and the window area are continuously aligned with the alphanumeric characters as a user controls a rate of movement of the reading focus tool.

FIG. 9 illustrates a screenshot 80 depicting a reading focus tool 52. The reading focus tool 52 includes a menu 82 having a plurality of drop down menus. The menu 82 includes at least a dropdown menu for File 84, View 86, Reading Notch 88, Reading Window 90, Help 92, close 93 (e.g., the 'x' symbol within a square box as known in the art), and may include other drop down menus. For instance other dropdown menu items may include a dropdown menu to change other characteristics of the reading focus tool 52, for example, a drop down menu for body 96; or other drop down menus known in the art such as: "Reference" or "About" (not shown). Further, a user may select File 84 to select to "open" or "close" a particular document or spreadsheet to be read.

As shown in FIG. 9, a plurality of alphanumeric characters 94 may be displayed on a monitor 64 (e.g., a computer monitor, a personal digital assistant display, an e-book's display and the like). The reading focus tool 52 overlays a plurality of alphanumeric characters 94 (e.g., the alphanumeric characters may be part of a text document, an editor, a document, a spreadsheet, an internet webpage and the like). The reading focus tool 52 includes a body 96, a rectangular window 98, a notch section 100 and a bottom 101. The notch section 100 includes a notch 102 and a view area 104. The notch 102 and view areas 104 are mutually exclusive from one another. Therefore the notch 102 and the view area 104 are both adjustable in width and height with respect to one another. Further, in positioning the reading focus tool 52, the notch section 100 may be displayed in a top position, a bottom position, aligned with a left margin or aligned with a right margin and combinations thereof based on user preference. For instance, in an embodiment, the notch 102 is aligned to a left margin, a plurality of alphanumeric characters are displayed in the view area 104, and the notch 102 may be moved toward a right margin at a rate determined by a user. In an alternative embodiment, the notch 102 may be aligned to a right margin, a plurality of alphanumeric characters are displayed in the view area 104, and the notch 102 may be moved toward a left margin at a rate determined by a user.

Figure 10:
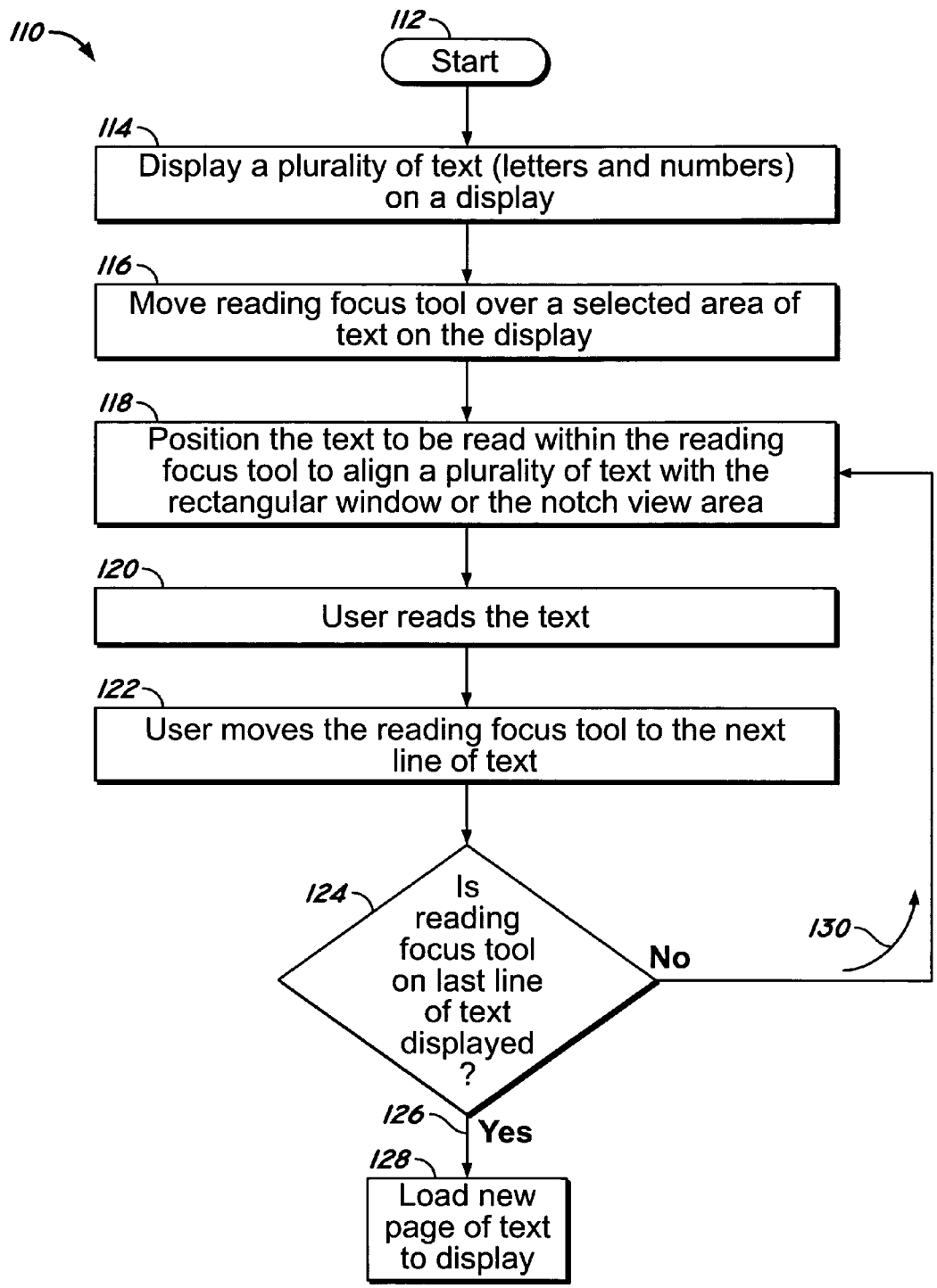
FIG. 10 is a flowchart illustrating a method for utilizing the reading focus tool of FIG. 9 in accordance with an alternative embodiment of the present invention.

The rectangular window 98 includes an open slot 106. Reading focus tool 52 may initially be placed beginning on the first line of text, but as shown in FIG. 9 for illustrative purposes, the reading focus tool 52 is shown in approximately the "middle" of the passage of text displayed on monitor 64. Alternatively, the reading focus tool 52 may be placed on any location on the display monitor 64 selected by a user. As shown in FIG. 9, the reading focus tool displays a plurality of alphanumeric characters in the rectangular window 98, the notch view area 104 and within the body 96 of the reading focus tool. The reading focus tool 52 may be utilized by a user to read alphanumeric characters either in the notch view area 104, the rectangular window area 106, or at the bottom 101 of the reading focus tool 52. The reading focus tool 52 may move independent of the underlying alphanumeric characters. Therefore, in an embodiment, the reading focus tool moves in at least one of an upward direction and a downward direction while the alphanumeric characters remain stationary. Alternatively, the reading focus tool remains stationary while the alphanumeric characters move in at least one of an upward direction, a downward direction, to the left and to the right. FIG. 10 illustrates a processing sequence 110 performed in connection with implementing a reading focus tool 52 shown in FIG. 9. The process sequence 110 beings at 112.

At 114, a plurality of text (e.g., alphanumeric characters from a document a spreadsheet, and interne web page, and the like) is displayed on monitor 64.

At 116, a reading focus tool 52 is moved over a selected area of text on the display. The reading focus tool includes a first section and a rectangular window 98 within the first section and a notch section 100. The reading focus tool 52 overlays the plurality of alphanumeric characters. The reading focus tool 52 may be positioned at a variety of positions on the display monitor 64, for example, aligned with the first line of text, placed in the middle of a page of text, or placed toward the end of the text. The reading focus tool 52 may also be rotated so that a person may read a line of text in the rectangular window 98 from left-to-right or, for example, from right-to-left.

At 118, the reading focus tool 52 is aligned with the text to be read. The text may be aligned within the view area 104 of the notch section 100 or the text may be aligned within the rectangular window 98. The text may further be aligned with the bottom 101 of the reading focus tool 52. In the case where a user may want to read more than one line, the user aligns the text with at least one of the view area 104, the rectangular window 98 or the bottom 101 of the reading focus tool 52. At least one line of text may be aligned within the rectangular window. To display a plurality of lines of text, a height and a width of at least the notch view area or the rectangular window have to be configured to correspond to a user selected area. A level of opaqueness may also be adjusted, where the level of opaqueness for the first section (e.g., body 96) ranges from transparent to opaque. In addition, the user may adjust the level of opaqueness of the rectangular window ranging from clear to translucent. In addition to aligning the text, adjusting the opaqueness, a user may also adjust the color of the first section and the color of the rectangular window 98. At 120, the user reads the text. At 122, the user moves the reading focus tool to the next line of text.

At 124, if the reading focus tool is positioned on the last line of text displayed on monitor 64, the process continues to 126 and at 128 loads a new page of text to be displayed. If the reading focus tool 52 is not on the last line of text, the process continues to 130, and at 118, a new line of text is positioned within the rectangular window 98, the notch view area 104, or the bottom 101 of the reading focus tool.

Returning to FIG. 9, alphanumeric characters are shown within the body 96 of the reading focus tool 52. A user may adjust the degree of opacity in the rectangular window 98, the notch view area 194 and the body 96 of the reading focus tool 52. Some persons may prefer to have the opacity of the body 96 darker when compared to the level of opacity displayed in the notch view area 104 or in the rectangular window 98. Persons suffering from behavioral disabilities, learning disabilities or vision disabilities may prefer the level of opaqueness between the body 96, the notch view 104 or the rectangular window 98 to be different because in order to increase their ability to focus on the alphanumeric characters displayed on the monitor 64. The level of opacity may range from clear, to transparent, to translucent to a multitude of various levels of opacity based on user need or user preference.

The reading focus tool 52 promotes focusing on a selected section of alphanumeric characters 94 (e.g., a small selected line of text from a document, a spreadsheet, or a displayed webpage, and the like). The reading focus tool 52 assists persons suffering from or suspected from suffering from at least one of an attention deficit disorder (ADD), an attention deficit hyperactivity disorder (ADHD), a dyslexia, a dyscalculia, an autism, an autism spectrum disorder, an Asperger's syndrome, a hyperkinesis, a hyperactivity, a pervasive developmental disorder-not otherwise specified (PDD-NOS), a low vision disability, a visual-spatial problem and a person recovering from stroke as well as patients suffering from other behavioral disabilities, learning disabilities or vision disabilities to focus on a selected segment of alphanumeric characters (e.g., a group of words, a phrase and the like). For instance, recovering stroke patients have difficulty coordinating the movement of their eyes in order to read properly; therefore the task of focusing in order to read is an issue. Alternatively, the reading focus tool 52, however, is not limited to persons suffering from any ailments, for example, persons not suffering from any of the listed behavioral disabilities, learning disabilities or vision disabilities may prefer to use the reading focus tool 52 because the tool provides reading comfort.

Figure 11A:
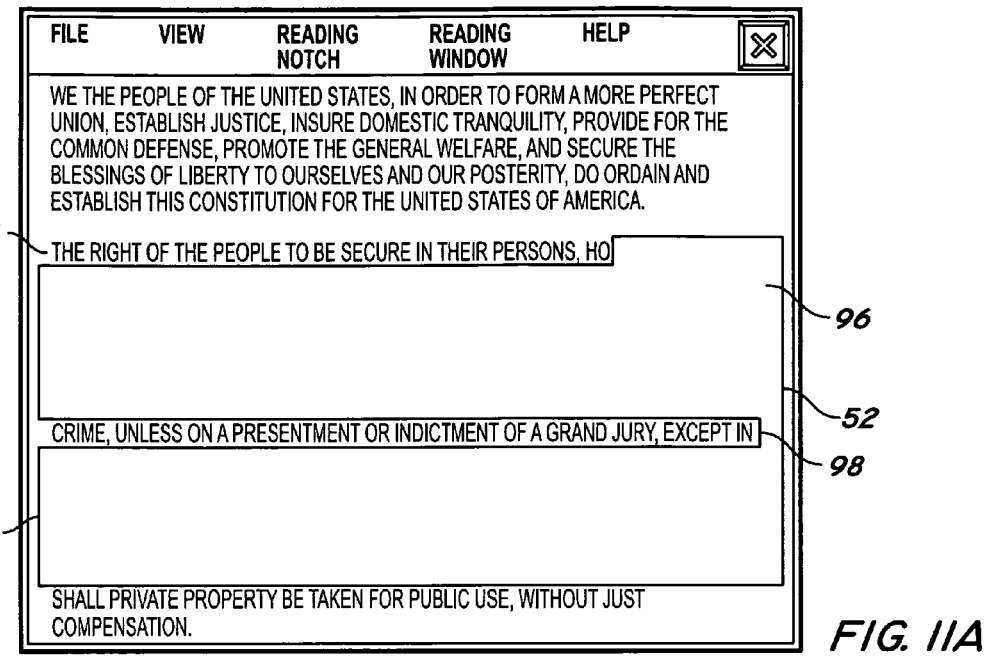
FIGS. 11A, 11B, 11C, illustrate screenshots depicting differing widths of the notch view area for the reading focus tool utilized in accordance with an embodiment of the present invention.
Figure 11B:
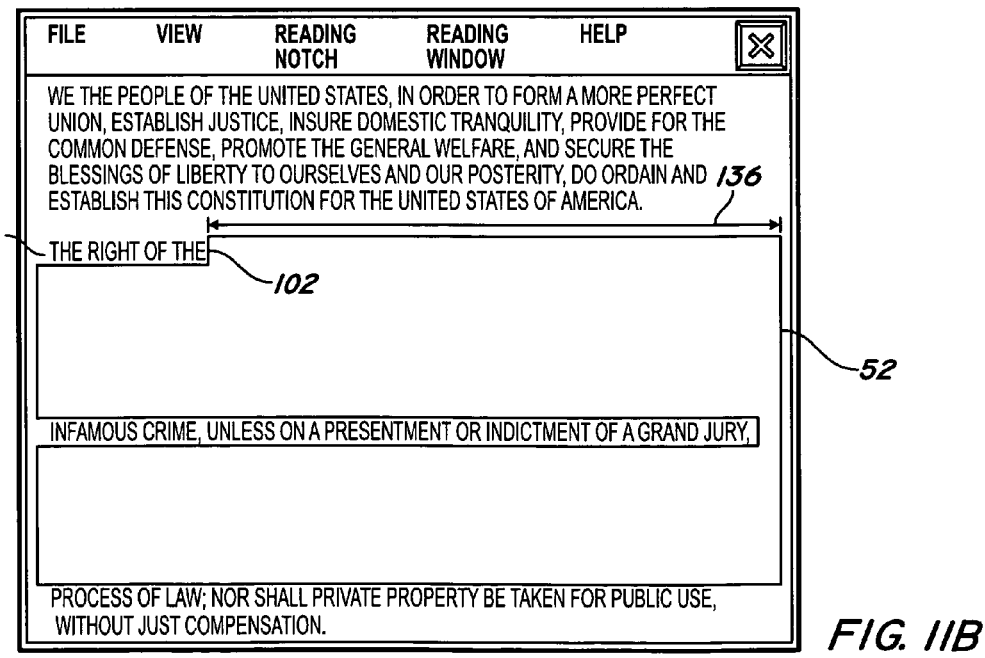
Figure 11C:
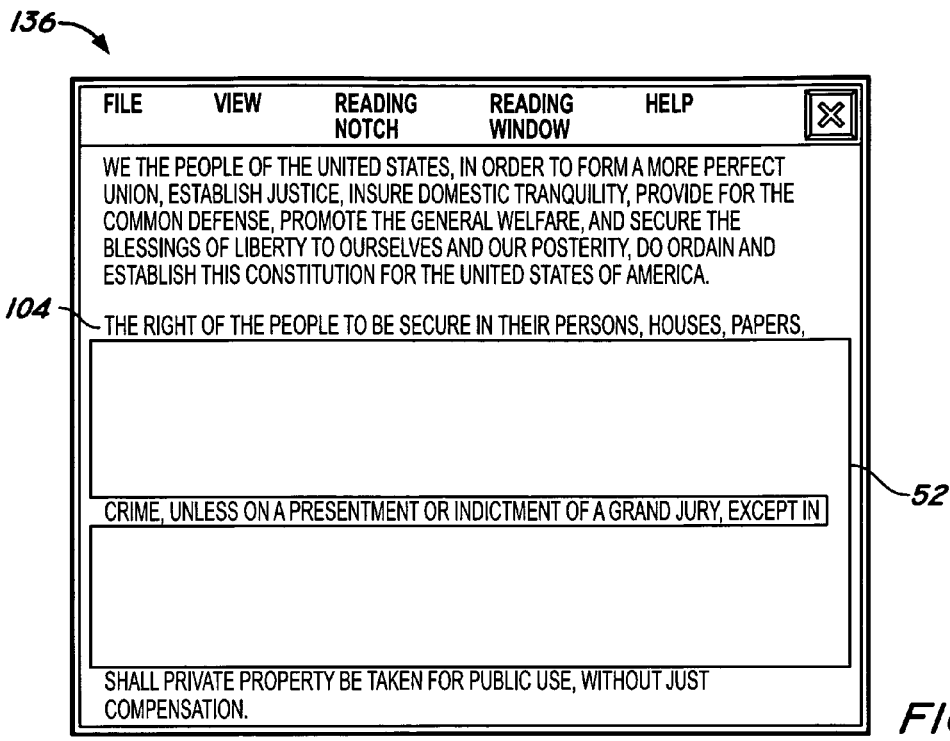

FIGS. 11A, 11B, 11C, illustrates screenshots 132, 134 and 136 each depicting differing widths of the notch view area 104 for the reading focus tool 52. FIG. 11A illustrates a screenshot 132 of the reading focus tool 52 where the body 96 is changed from clear (as shown in FIG. 9) to opaque. FIG. 11A shows by making the body 96 opaque a person's eyes are focused onto at least one of the rectangular window 98, the notch view area 104 and the text below the bottom 101 of the reading focus tool 52. FIG. 11B illustrates a screenshot 134 of the reading focus tool 52 where the notch view area 104 is minimized compared to the length 136 of the notch 102. FIG. 11C illustrates a screenshot 136 of the reading focus tool 52 where the notch view area 104 is maximized such that the notch 102 is eliminated. Thus, as shown in the various screenshots 132, 134 and 136 in FIGS. 11A, 11B, and 11C the width of the notch view area 104 can be adjusted based upon a user preference and upon user need. Some users may prefer that fewer characters are displayed in the notch view area 104 for greater focus and concentration while reading. Other users may need fewer or greater alphanumeric characters displayed in the notch view area 104 in order to focus while reading.

As shown in FIG. 9, the body 96, the notch view area 104, and rectangular window 98 are clear. Alternatively, in FIG. 11A, the body 96 is opaque and the notch view area 104 and rectangular window 98 are clear. Further, in another example, the body 96 may be translucent and the rectangular window 98 may be transparent and the notch view area 104 may be clear. The user may have to experiment with different colors for the body 96, the notch view area 104, and the rectangular window 98, different levels of opacity in the body 96, notch view area 104 and the rectangular window 98 to find an acceptable combination that is uniquely comfortable. The user may also have to experiment with the size of the font for the alphanumeric characters, as well as the color of the characters and the color of the background to find the most comfortable reading environment.

Figure 12:
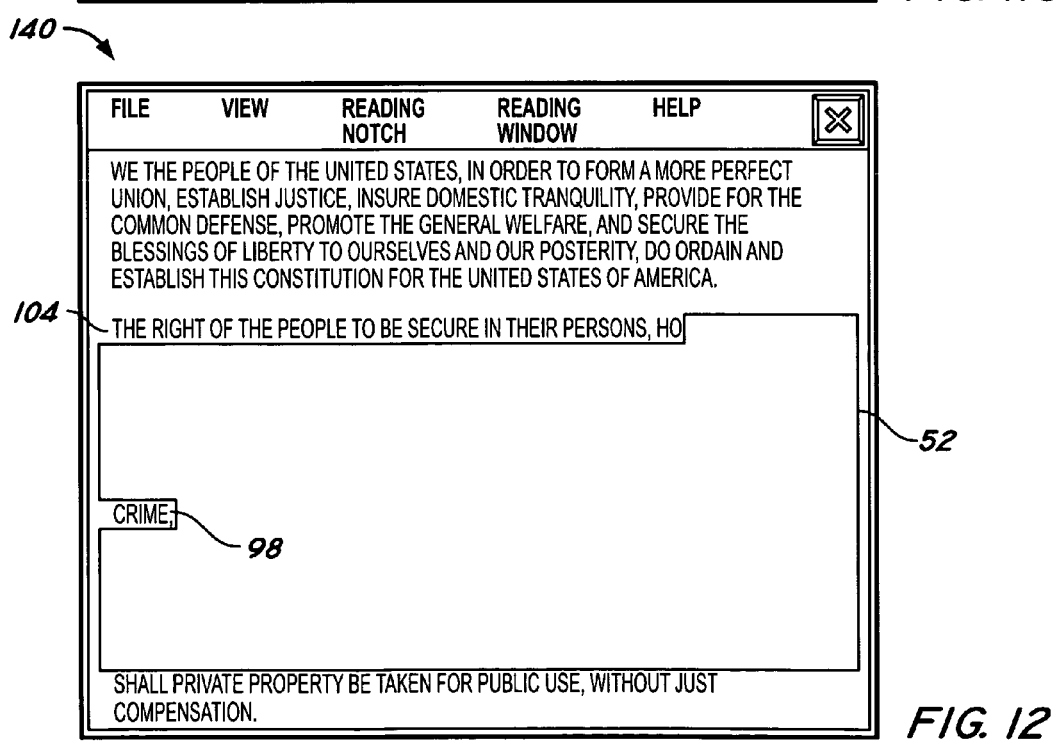
FIG. 12 illustrates a screenshot depicting changing the width of the rectangular window for the reading focus tool utilized in accordance with an embodiment of the present invention.

FIG. 12 illustrates a screenshot depicting changing the width of the rectangular window 98 for a reading focus tool 52. The width of the rectangular window 98 can be adjusted. Returning to FIG. 9, the rectangular window 98 is shown to display an entire line of alphanumeric characters (e.g., text). The rectangular window 98 may be adjusted in width to display a column of text, for example a newspaper column of text that is about 11 pica wide, or any column width selected by a user (e.g., the column width may be in inches, in pica, in pixels, in a specific number of alphanumeric characters, and the like). For example, FIG. 12 shows how the rectangular window 98 may be minimized to show a minimum of five alphanumeric characters. The rectangular window may be decreased to a range where no alphanumeric characters are displayed (not shown) to the maximum number of characters displayed on the monitor 64 (e.g., which will depend on the size of the monitor).

Figure 13:
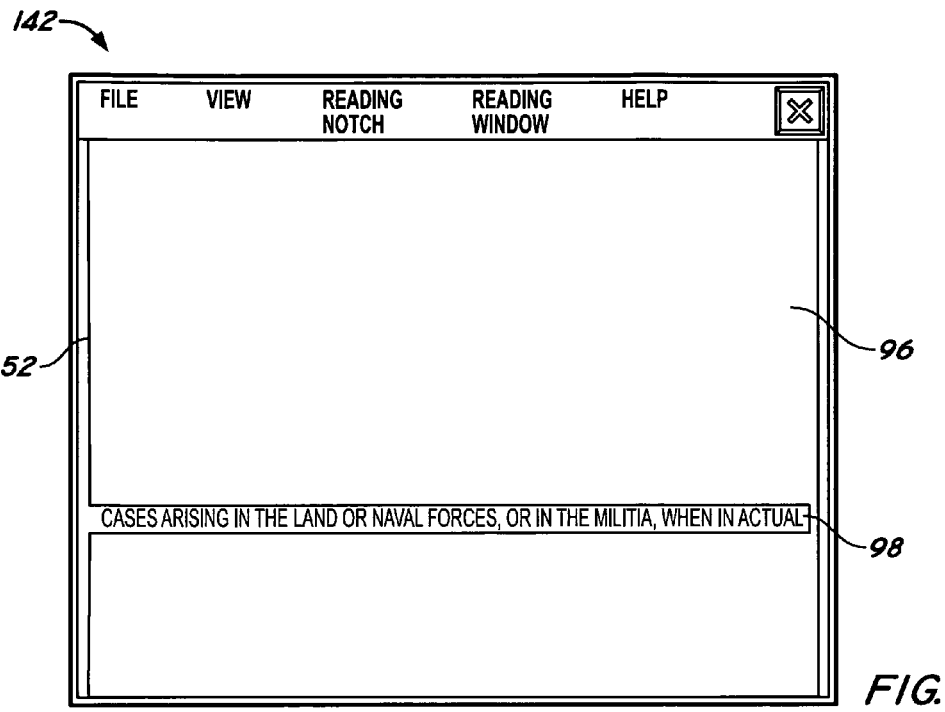
FIG. 13 illustrates another embodiment of the reading focus tool utilized in accordance with an embodiment of the present invention.

FIG. 13 illustrates a screenshot 142 depicting the reading focus tool 52 utilized in accordance with another embodiment of the present invention. FIG. 13 illustrates the removal of the notch section 100, (e.g. the notch view area 104 and the notch 102 are not shown) and the removal of the bottom 101 of the reading focus card 52. The body 96 is opaque such that the only alphanumeric characters displayed are shown in the rectangular window 98 of the reading focus tool 52. In this embodiment, the user will read the alphanumeric characters displayed in the rectangular window 98 and then use an input device, such as the keyboard 68, to move the rectangular window 98 to the next line of alphanumeric characters to be read. Alternatively, the user may move the rectangular window 98 to alphanumeric characters that have been previously read.

Figure 14:
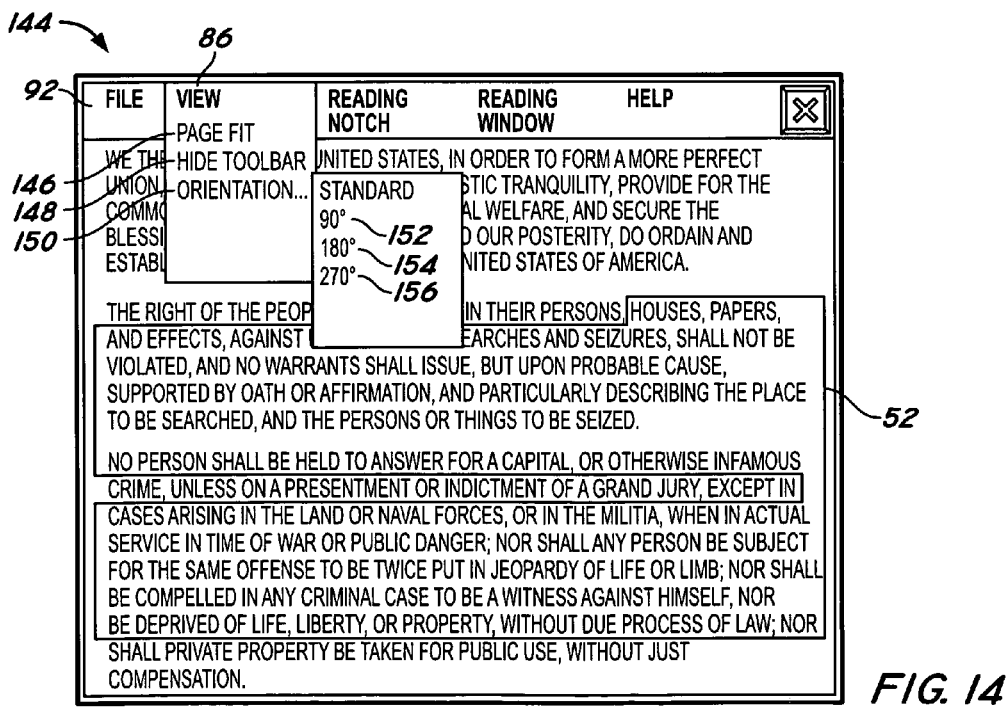
FIG. 14 illustrates a screenshot depicting a plurality of dropdown menus for the reading focus tool utilized in accordance with an embodiment of the present invention.

FIG. 14 illustrates a screenshot 144 depicting the menu 92 of the reading focus tool 52. Screenshot 144 depicts a drop down menu for "View" 86 that provides at least three selections: "Page fit" 146, "Hide Toolbar" 148, and "Orientation" 150. In addition, FIG. 14 illustrates typical selections available to the user when "Orientation" 150 may be selected, such as "Standard" 152, "90 degrees" 154, "180 degrees" 156, and "270 degrees" 158. Orientation 150 allows the user to rotate the reading focus tool 52 within the display of the monitor 64. For instance in a typical "standard" 152 orientation the notch view area 104 may be aligned horizontally to the left margin. By selecting "90 degrees" 154, the user may orient the reading focus tool 52 such that the notch view area 104 is aligned vertically to the left margin. By selecting "180 degrees" 156 a user may orient the reading focus tool 52 such that the notch view area 104 is aligned horizontally to the right margin. By selecting "270 degrees" 158, a user may orient the reading focus tool 52 such that the notch view area 104 is aligned vertically to the right margin.

When utilizing the reading focus tool 52, a user may change the orientation 150 of the reading focus tool 52 from the standard 152 view to rotate the tool 90 degrees, 180 degrees or 270 degrees. The various orientations of the reading focus tool 52 promote eye movement depending upon the location of the open slot 106 of the rectangular window 98. For instance in the standard 152 view, left-to-right eye movement is promoted to facilitate reading languages such as English that are read from left-to-right. Alternatively, if the reading focus tool 52 is oriented 180 degrees, right-to-left eye movement is promoted (e.g., to facilitate reading languages such as Arabic that are written right-to-left). Furthermore, if the reading focus tool is oriented 270 degrees, reading from the bottom of the display to the top of the display is promoted.

Figure 15:
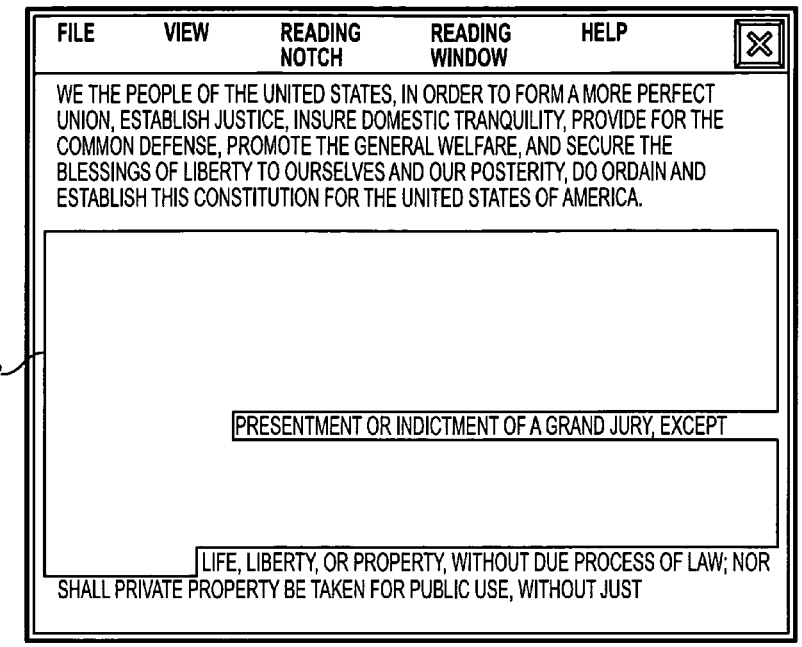
FIG. 15 illustrates a screenshot of the reading focus tool oriented for reading from right-to-left reading in accordance with an embodiment of the present invention.
Figure 16A:
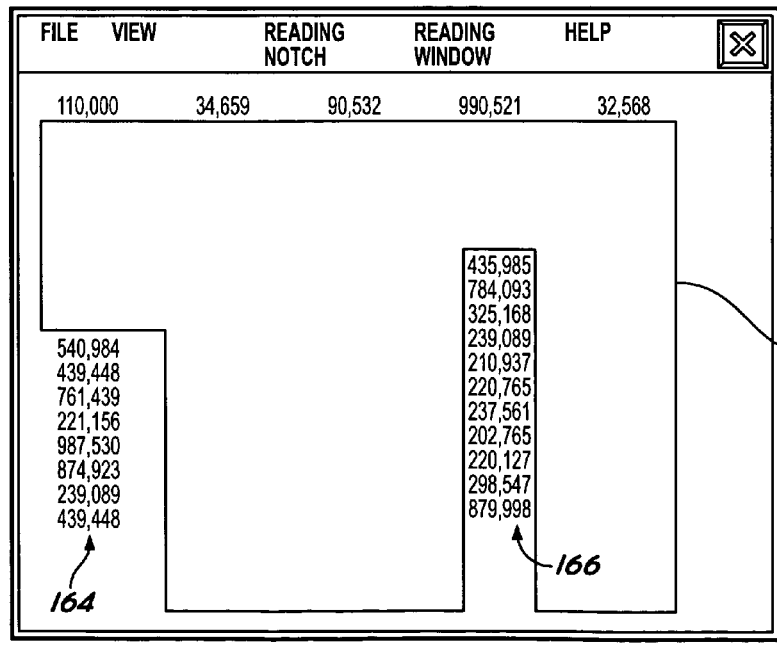
FIGS. 16A and 16B illustrate screenshots of the reading focus tool oriented to assist in reading spreadsheets in accordance with an embodiment of the present invention.
Figure 16B:
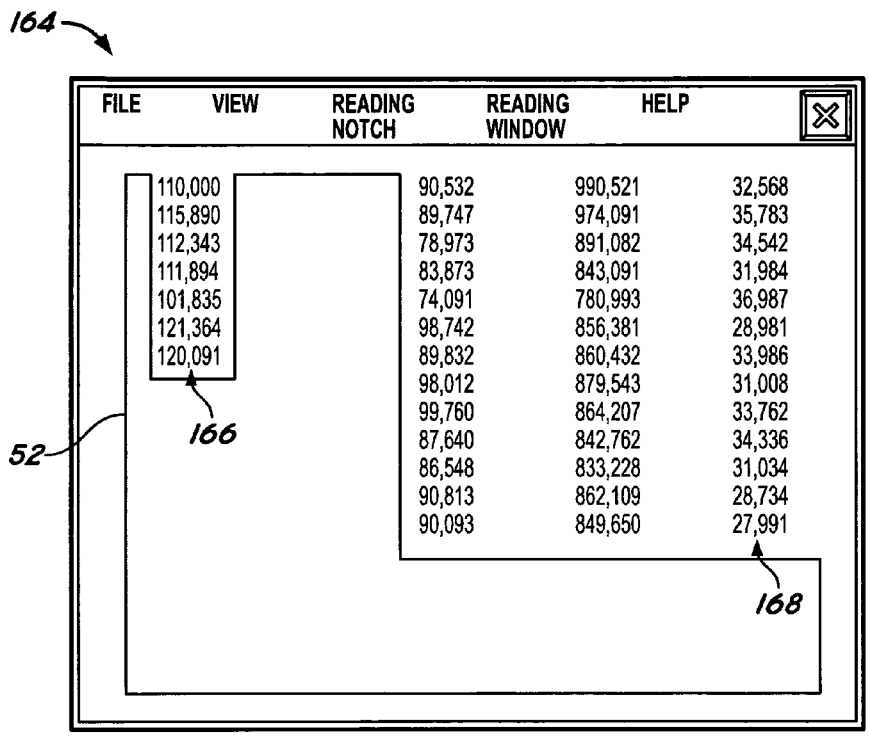

For example, FIG. 15 illustrates a screenshot 160 of the reading focus tool 52 where the user has changed the orientation 150 of the reading focus tool 52 to "180 degrees" 156. FIGS. 16A and 16B illustrate screenshots 162 and 164 depicting various orientations of the reading focus tool 52. FIG. 16A illustrates screenshot 162 that shows the reading focus tool 52 orientated at "270 degrees" 158. Further, FIG. 16B illustrates screenshot 164 that shows the reading focus tool 52 oriented at "90 degrees" 154. As depicted in FIGS. 16A and 16B, the reading focus tool 52 may be used with a spreadsheet to align a column 166 of numbers or a row 168 of numbers.

Figure 17:
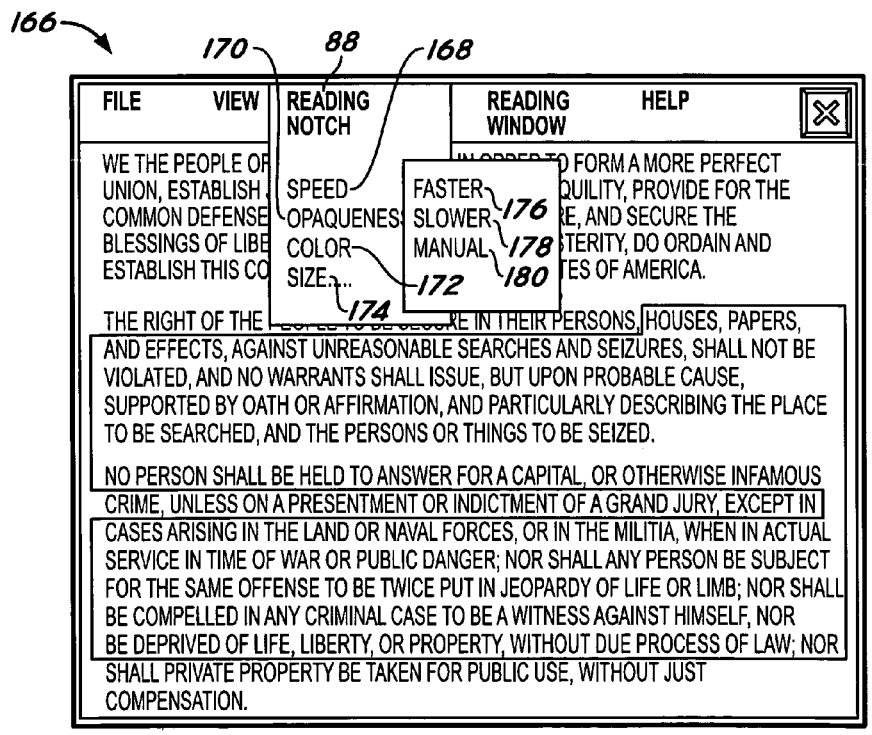
FIGS. 17 and 18 illustrate screenshots of a drop down menu for a reading notch for the reading focus tool in accordance with an embodiment of the present invention.

FIG. 17 illustrates a screenshot 166 depicting a drop down menu for "Reading Notch" 88 for the reading focus tool 52. Reading Notch 88 provides at least four user selections: "Speed" 168, "Opaqueness" 170, "Color" 172, and "Size" 174. Typical selections available to the user when "Speed" 168 may be selected include "faster" 176, "slower" 178, and "manual" 180. "Faster" 176 moves the notch 102 at a predetermined speed that is quicker than "slower" 178. The rate of the notch is determined as known in the art for displaying text while reading at different rates and different skill levels of reading. "Manual" 180 moves the notch 102 at a user defined rate.

The reading focus tool 52 may automatically move the notch view area 104 (e.g., moving the notch 102 to display alphanumeric characters at a particular predetermined rate) over a set of words at a particular predetermined rate. For instance, the notch 102 may be moved at one predetermined rate that will allow the width of the notch view area 104 to increase. The rate of the alphanumeric characters displayed in the notch view area 104 may be adjusted based on user preference or need. The rate of the alphanumeric characters displayed may be less than or equal to the rate of the notch 102. Further, the notch 102, the notch view area 104, and the rectangular window 98 may be set at independent rates (e.g., faster, slower, or at the same rate for each other), which may be predetermined or may be user determined. Alternatively, the user may select "manual" 180 to move the notch view area 104 at a rate set by the user.

Figure 18:
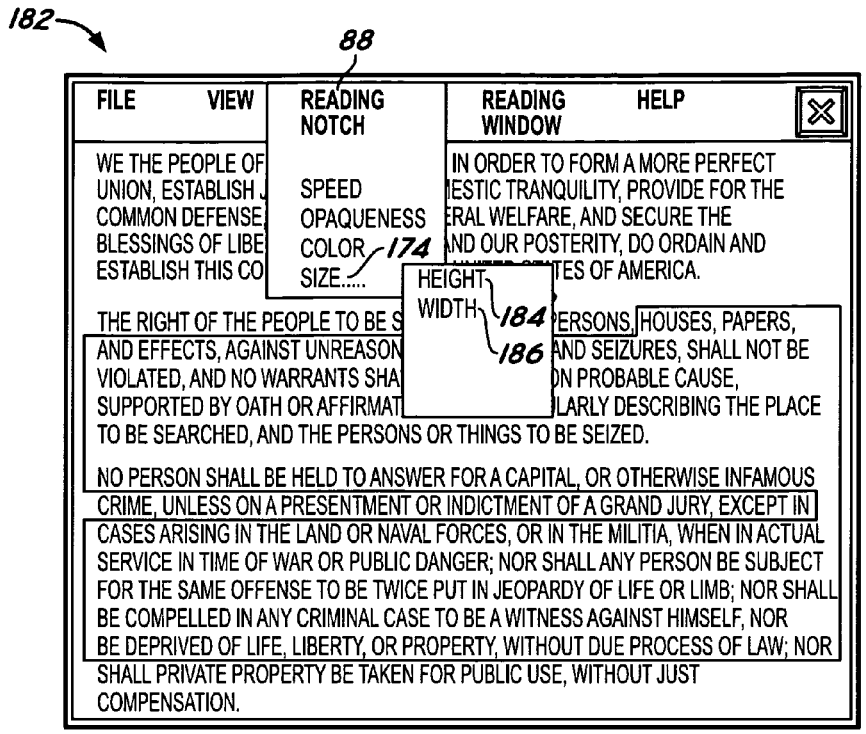

FIG. 18 illustrates a screenshot 182 depicting a drop down menu for a "Reading Notch" 88 for the reading focus tool 52. Reading Notch 88 provides at least four user selections as described above. Typical selections available to the user when "Size" 174 may be selected include "height" 184, "width" 186. By selecting "height" 184, the user may adjust the size of the notch 102 to be more than one line in height. In addition, the user may adjust the notch view area to display more than a single line of alphanumeric characters. For instance, FIG. 11C shows the notch view area 104 maximized such that there is no notch 102. In addition, FIG. 11B shows the notch view area 104 minimized in comparison. The notch view area 104 can be minimized so that no alphanumeric characters are displayed.

Similarly, a user may adjust the size of the reading window 98 by selecting from menu 82 "Reading Window" 90 and then selecting "Size" 196. Size 196 permits at the user to select at least a height and a width for the reading window 98. Both the height and the width of the reading window 98 may be adjusted to display as many or as few alphanumeric characters selected by the user based on user need or user preference. For example as shown in FIG. 11A, the reading window 98 may be set to display an entire line of alphanumeric characters. Alternatively, as shown in FIG. 12, the reading window 98 may be set to display a few alphanumeric characters. In addition, the user may select to display at least one line of alphanumeric characters or more than one line (not shown).

Figure 19:
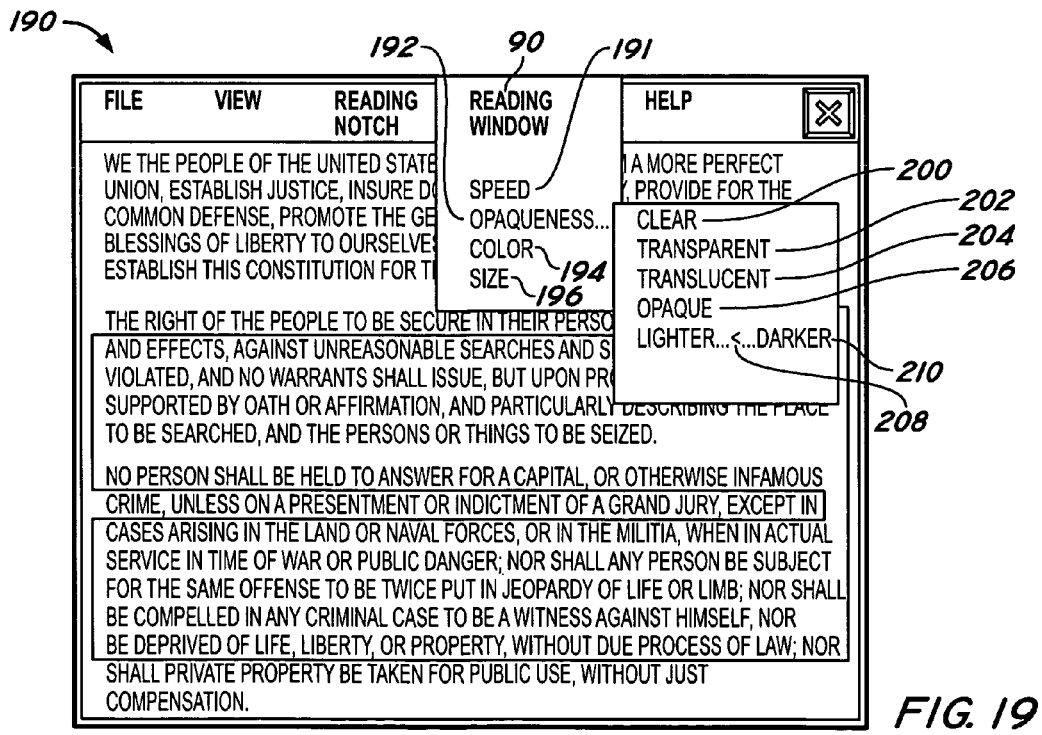
FIG. 19 illustrates a screenshot of a drop down menu for a reading window for the reading focus tool in accordance with an embodiment of the present invention.

FIG. 19 illustrates a screenshot 190 depicting a drop down menu for a "Reading Window" 90 for the reading focus tool 52. Reading Window 90 provides at least four user selections: "Speed" 191, "Opaqueness" 192, "Color" 194, and "Size" 196. These four selections are similar to the selections offered for the drop down menu for "Reading Notch" 88, and the four selections function identically for the reading window 98 as they did for the reading notch 88 as described above. When a user selects "Opaqueness" 192, typical preset selections available may include "clear" 200, "transparent" 202, "translucent" 204, and "opaque" 206. In addition, a user has the ability to manually change the level of opaqueness from lighter to darker by moving an indicator 208 within a range "lighter to darker" 210. Allowing the user the ability to change the level of contrast within the reading window 98 may allow persons afflicted with certain ailments previously described (e.g., ADD, ADHD, recovering from stroke and the like) to focus on the alphanumeric characters displayed in the rectangular window 98. For example, as shown in FIG. 9, body 96 may be clear and therefore show the underlying alphanumeric characters. Alternatively, as shown in FIG. 11A, the body 96 may be opaque and, therefore, the underlying alphanumeric characters are hidden.

Further, FIG. 19 illustrates a screenshot 166 depicting a drop down menu for "Reading Window" 90 for the reading focus tool 52. The selections for the "Reading Window" 90 are similar to the selections for "Reading Notch" 88 described above and shown in FIG. 17. For instance, when a user selects "Speed" 168, in Reading Notch 88, the user is provided a choice to select: "faster" 176, "slower" 178, or "manual" 180. Similarly, when a user selects "Speed" under the drop down menu for "Reading Window" 90, the selections for "faster, "slower" and "manual" are equivalent to what has been previously described. For instance, "Faster" moves the reading window 98 at a predetermined speed that is quicker than "slower". By selecting "Manual" 180 alphanumeric characters are displayed in the rectangular window at a user-defined rate. The rate of the notch 102 as well as the rate alphanumeric characters that are displayed in the rectangular window 98 and view are 104 are determined as known in the art for displaying text while reading at different rates and different skill levels of reading.

The reading focus tool 52 may automatically move the rectangular window 98 over a set of alphanumeric characters at a particular predetermined rate. The rate of the alphanumeric characters displayed in the rectangular window 98 may be adjusted based on user preference or need. The rate of the alphanumeric characters displayed may be less than or equal to the rate of movement of the rectangular window 98 width. Alternatively, the user may select "manual" 180 to move the rectangular window 98 at a rate set by the user.

The menu 82 and the various drop down menus file 84, view 86, reading notch 88, and reading window 90 are merely exemplary and not restrictive. Thus, the menu 82 or the selections available in the drop down menu do not show nor constitute all the possible combinations for the reading focus tool 52.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method for reading, said method comprising:
    displaying a plurality of alphanumeric characters on a display device connected to an automated device having a processor, a memory, and an input device;
    executing a plurality of instructions that configure the processor to provide a reading focus tool on the display device, the reading focus tool having a first section and a rectangular window within the first section and a notch section, wherein the notch section comprises at least one of a notch area and a view area, wherein the view area displays a plurality of alphanumeric characters and wherein the reading focus tool overlays the plurality of alphanumeric characters, and wherein the first section is variably opaque and the rectangular window comprises a color selectable by the user;
    aligning at least one line of alphanumeric characters within at least one of the rectangular window and the notch section; and
    enabling a user to move the reading focus tool to a selection of alphanumeric characters to be read.

2. The method for reading according to claim 1, further comprising:
    configuring a height and a width of the area of the reading focus tool to correspond to a user selected area on the display device.

3. The method for reading according to claim 1, further comprising:
    adjusting a level of opaqueness for the first section, wherein the level of opaqueness ranges from light to opaque.

4. The method of reading according to claim 1, further comprising:
    adjusting the opaqueness of the rectangular window from at least one of light to translucent.

5. The method of reading according to claim 1, further comprising:
    selecting a first color for the first section and a second color for the rectangular window.

6. The method of reading according to claim 1, further comprising:
    adjusting a vertical size of the rectangular window, wherein the rectangular window is configured to display a plurality of alphanumeric characters composing at least one line of text.

7. The method of reading according to claim 1, further comprises:
    adjusting a width of the rectangular window, wherein the width is at least a column that is about 11 pica wide.

8. The method of reading according to claim 1, wherein the notch and view area are mutually exclusive and both the notch and view area are adjustable in width and height with respect to one another.

9. The method of reading according to claim 1, further comprising:
    positioning the reading focus tool, wherein the notch section is displayed in at least one of a top position, a bottom position, aligned with a left margin, aligned with a right margin and combinations thereof based on user preference.

10. The method of reading according to claim 1, wherein the notch section is configured such that:
    the notch is aligned to a left margin;
    a plurality of alphanumeric characters are displayed in the view area; and
    the notch is moved toward a right margin at a rate determined by a user.

11. The method of reading according to claim 1, wherein the notch section is configured such that:
the notch is aligned to a right margin;
a plurality of alphanumeric characters are displayed in the view area; and
the notch is moved toward a left margin at a rate determined by a user.

12. The method of reading according to claim 1, wherein the notch section is configured, wherein a width of the view area is greater than a width of the notch.

13. The method of reading according to claim 1, wherein moving the reading focus tool further comprises enabling a user to move at least one of the rectangular window and the notch section in at least one of an upward and a downward direction by utilizing the input device.

14. The method of reading according to claim 1, wherein the reading focus tool executes and operates within the context of a word processing program, a spreadsheet program, or an internet web page.

15. The method of reading according to claim 1, wherein the reading focus tool moves independent of the displayed, underlying alphanumeric characters.

16. A system for assisting a person while reading, the system comprising:
an automated device having a processor, a memory, an input device and a display;
the display device configured to show a plurality of characters;
the processor executing a plurality of instructions to display a reading focus tool over the plurality of characters on the display device, the reading focus tool having a first section, a rectangular window, and a notch area wherein the notch section comprises at least one of a notch area and a view area, wherein the view area displays a plurality of alphanumeric characters and wherein the first section is variably opaque and the rectangular window comprises a color selectable by the user; and
the reading focus tool configured to respond to user commands directing the input device to control:
a height and a width of the rectangular window and the notch area; and
a rate the rectangular window and the notch area move over the plurality of characters.

17. The system according to claim 16, wherein the plurality of characters comprise at least one of a line of alphanumeric characters, a column of alphanumeric characters, a document and a spreadsheet.

18. The system according to claim 16, wherein the person comprises a person having at least one of an attention deficit disorder (ADD), an attention deficit hyperactivity disorder (ADHD), a dyslexia, a dyscalculia, an autism, an autism spectrum disorder, an Asperger's syndrome, a hyperkinesis, a hyperactivity, a pervasive developmental disorder-not otherwise specified (PDD-NOS), a low vision disability, a person recovering from stroke, a visual-spatial problem and other behavioral disabilities, learning disabilities or vision disabilities.

19. A computer program embodied on a non-transitory computer readable medium for assisting persons to read, said medium comprising instructions configured to direct an operation of an automated device having a processor, a memory, an input device, and a display device, wherein the display device is configured to display a plurality of alphanumeric characters, the instructions configured to instruct the processor to:
position a reading focus tool having a first area, a window area, and a notch area over the plurality of alphanumeric characters wherein the notch section comprises at least one of a notch area and a view area, wherein the view area displays a plurality of alphanumeric characters;
provide a variably opaque overlay over the first area;
provide a color overlay over the window area in a color selectable by the user;
align the reading focus tool such that the alphanumeric characters are displayed in at least one of the notch area and the window area; and
move the reading focus tool, wherein at least one of the notch area and the window area are continuously aligned with the alphanumeric characters as a user controls a rate of movement of the reading focus tool.

* * * * *